United States Patent
Faulring et al.

(10) Patent No.: US 8,573,142 B2
(45) Date of Patent: Nov. 5, 2013

(54) FOLIAGE SEPARATOR FOR A TRANSPLANTER

(75) Inventors: Frank W. Faulring, North Collins, NY (US); Charles H. Hoffman, Springville, NY (US); Chad S. Lookabill, Dayton, OR (US)

(73) Assignees: Faulring Mechanical Devices, Inc., North Collins, NY (US); Morning Star Company, Woodland, CA (US)

( * ) Notice: Subject to any disclaimer, the term of this patent is extended or adjusted under 35 U.S.C. 154(b) by 0 days.

(21) Appl. No.: 13/421,897

(22) Filed: Mar. 16, 2012

(65) Prior Publication Data

US 2012/0174839 A1     Jul. 12, 2012

Related U.S. Application Data

(63) Continuation-in-part of application No. 12/221,081, filed on Jul. 31, 2008, now Pat. No. 7,954,439.

(60) Provisional application No. 61/453,990, filed on Mar. 18, 2011.

(51) Int. Cl.
    *A01C 11/00*      (2006.01)

(52) U.S. Cl.
    USPC ........................................ 111/105; 111/919

(58) Field of Classification Search
    USPC .......... 111/100–117, 200, 900, 919, 921, 922
    See application file for complete search history.

(56) References Cited

U.S. PATENT DOCUMENTS

| 3,483,605 | A | * | 12/1969 | Fabish ........................... 407/54 |
|---|---|---|---|---|
| 4,893,571 | A | | 1/1990 | Hakli |
| 5,868,086 | A | | 2/1999 | Willams |
| 6,080,951 | A | * | 6/2000 | Thijssen et al. ............... 209/577 |
| 7,905,186 | B2 | * | 3/2011 | Faulring et al. ............... 111/105 |
| 7,954,439 | B2 | * | 6/2011 | Faulring et al. ............... 111/105 |
| 8,122,838 | B2 | * | 2/2012 | Faulring ........................ 111/105 |
| 2006/0046914 | A1 | * | 3/2006 | Endelman et al. ............ 482/142 |

FOREIGN PATENT DOCUMENTS

| JP | 4320604 A | | 11/1992 |
|---|---|---|---|
| JP | 05240863 A | * | 9/1993 |
| JP | 7298736 A | | 11/1995 |
| JP | 8280209 A | | 10/1996 |
| JP | 2000262115 A | | 9/2000 |
| JP | 2000279007 A | | 10/2000 |
| JP | 2009082089 A | | 4/2009 |

* cited by examiner

*Primary Examiner* — Christopher J Novosad
(74) *Attorney, Agent, or Firm* — John C. Thompson; Sandra J. Thompson

(57) ABSTRACT

Foliage separator for a transplanter, and more particularly an apparatus for separating the foliage of adjacent rows of seedlings which are grown in trays having a plurality of side-by side rows of seedling cells. The foliage separator includes a rotating beater bar, the beater bar being positioned at an angle with a progressive taper, the beater bar being mounted for movement with a carriage which carries a subassembly for picking up an entire row of seedlings from a nursery tray and positioning them for hand-off to a seedling loader group. An air knife may be mounted on the same carriage, the air knife facilitating separation by keeping the seedling foliage and stems up and helping the beater bar enter between adjacent rows.

8 Claims, 7 Drawing Sheets

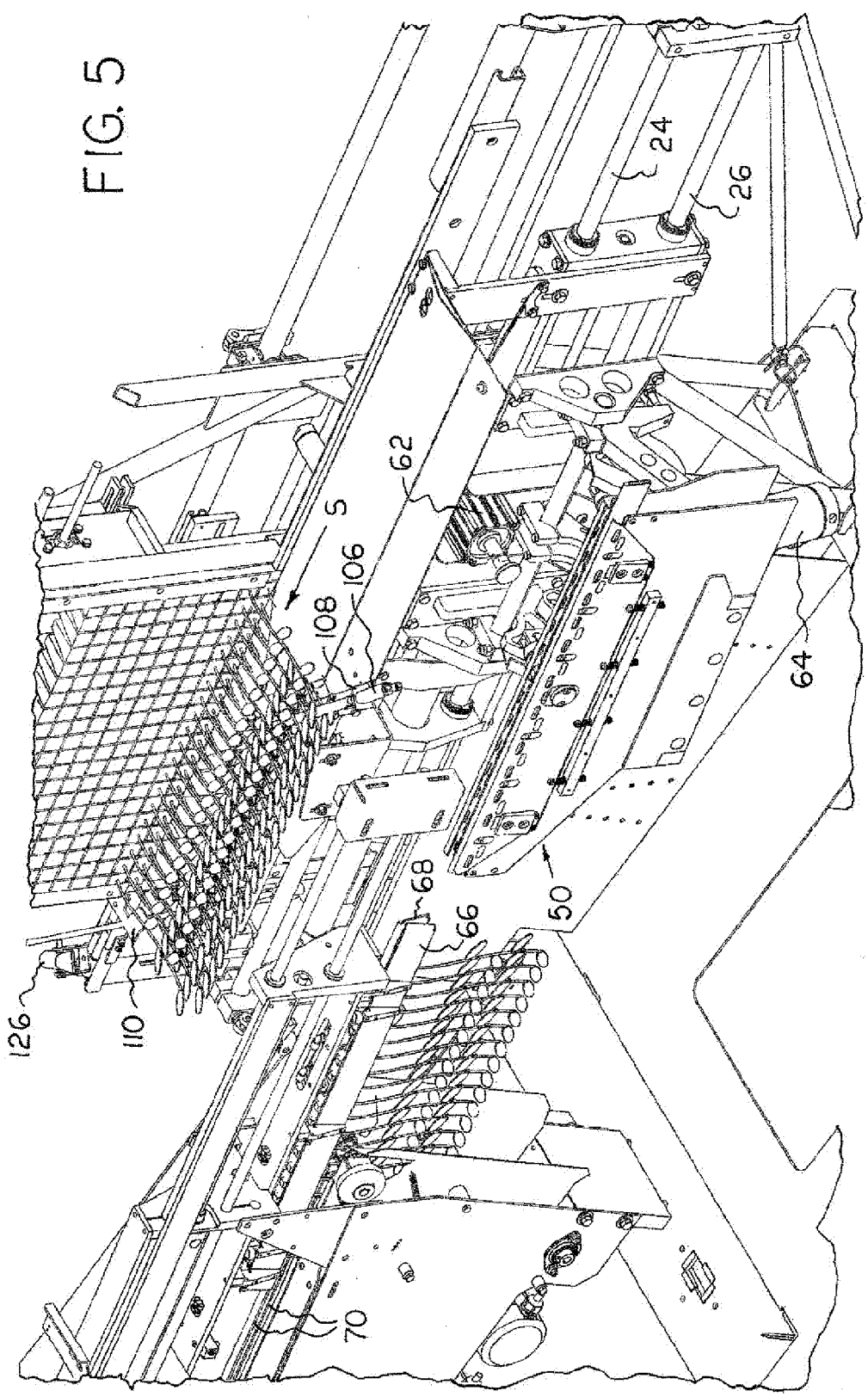

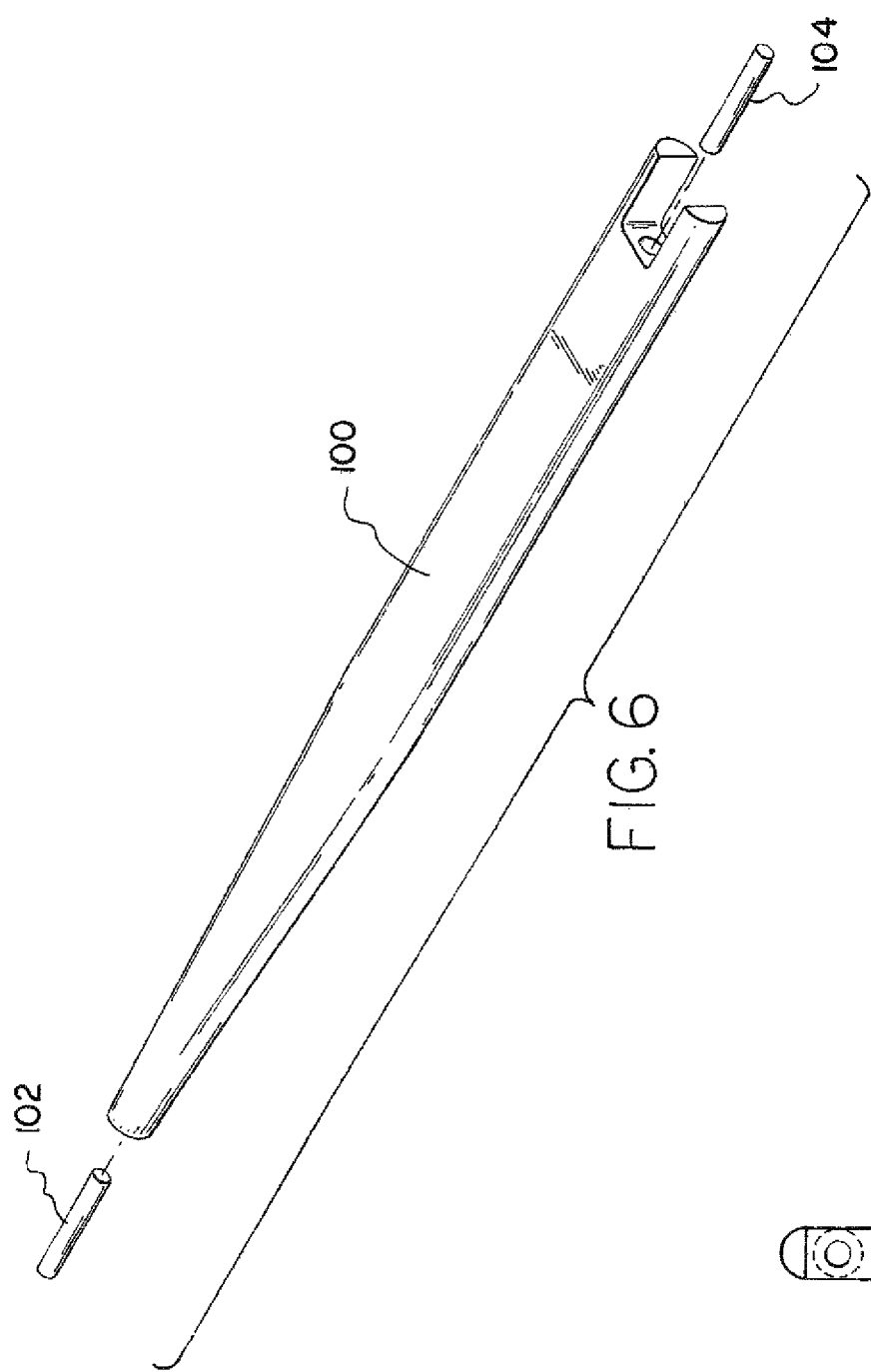

FOLIAGE SEPARATOR FOR A TRANSPLANTER

CROSS-REFERENCE TO RELATED APPLICATIONS

The present application is a continuation-in-part of U.S. patent application Ser. No. 12/221,081 filed Jul. 31, 2008, and entitled TRANSPLANTER, and granted as U.S. Pat. No. 7,954,439. In addition, this application claims the benefit under 35 U.S.C. §119(e) of U.S. provisional patent application Ser. No. 61/453,990 filed Mar. 18, 2011.

TECHNICAL FIELD

The present invention relates generally to transplanters, and more particularly to an apparatus for picking up an entire row of seedlings from the nursery tray without significant damage to the leaves of the seedlings in adjacent rows, the apparatus including aggressive means for separating the leaves of the row being picked up from the leaves of adjacent rows of seedlings.

BACKGROUND OF THE INVENTION

U.S. Pat. No. 7,954,439 shows an apparatus for transplanting seedlings grown in nursery trays having a plurality of side-by side rows of seedling cells, which apparatus plants the seedlings uniformly spaced apart even though not all cells in the nursery tray has seedlings. The apparatus picks up an entire row of seedlings from a tray, which row may have gaps between seedlings, transfers the seedlings to a mechanism which eliminates gaps between seedlings, and then delivers them to a gap-up belt assembly which discharges the seedlings one at time to the ground with a desired spacing between the seedlings. The seedlings have a root ball, stem, and leaves or foliage. Some plants have a jagged edge leaf. During plant extraction from the tray the leaves of adjacent rows of seedlings may have a tendency to interlock together. This results in a situation where the plant foliage has to be forcibly separated. Under normal conditions with average plants there usually is not much damage to the plant foliage. However, with young tender plants they are sometimes stripped of many or all of their leaves, and thus the planted seedlings fail to thrive. In the apparatus shown in U.S. Pat. No. 7,954,439 a pair of separation spears are employed to separate the leaves of adjacent rows of seedlings, and after they have been fully extended between the rows of seedlings they are "bumped" or "jittered" to ensure that the seedlings are in the extraction spears.

OBJECTS AND SUMMARY OF THE INVENTION

It is an object of this invention to provide a transplanting apparatus which picks up an entire row of seedlings from a nursery tray having a plurality of side-by-side rows of seedlings, which apparatus includes aggressive means for separating the foliage of the row being picked up from the foliage of adjacent rows of seedlings.

More particularly, it is an object of the present invention to provide an apparatus for separating plants grown in adjacent rows in nursery trays, and for picking up an entire row of seedlings from the nursery tray without significant damage to the leaves of the seedlings in adjacent rows. Each seedling includes a root ball, stem, and leaves. The apparatus includes a nursery tray indexing mechanism which indexes nursery trays one row at a time, a carriage, and means for extracting an entire row of seedlings mounted on the carriage. The apparatus additionally includes means for moving the carriage between an extended position where the means for extracting an entire row of seedlings is to one side of the tray indexing mechanism and a retracted position where the means for extracting an entire row of seedlings is located adjacent a nursery tray. In accordance with this invention aggressive means are provided for separating the leaves of seedlings in adjacent rows. The aggressive means for separating the leaves may be a rotating beater bar, the beater bar being positioned at an angle, and having a progressive taper, the beater bar being mounted for movement with the carriage. In addition, an air knife assembly may be provided which blows a narrow stream of air between the leaves to extend the leaves and associated stem to facilitate the entry of the beater bar between the rows.

These and other objects and advantages of this invention will become apparent to those skilled in the art after a consideration of the following detailed description taken in conjunction with the accompanying drawings in which a preferred embodiment of the present invention is illustrated.

BRIEF DESCRIPTION OF THE FIGURES

FIG. 5 is a view showing the seedling loader group transferring seedlings to a gap-up belt assembly, the carriage and the subassembly for picking up an entire row of seedlings being shown in its partially extended position;

FIGS. 6-7 are details of the beater bar, FIG. 6 being an exploded view of the beater bar assembly, and FIG. 7 being an end view taken from the drive end.

DETAILED DESCRIPTION

Figure 1:
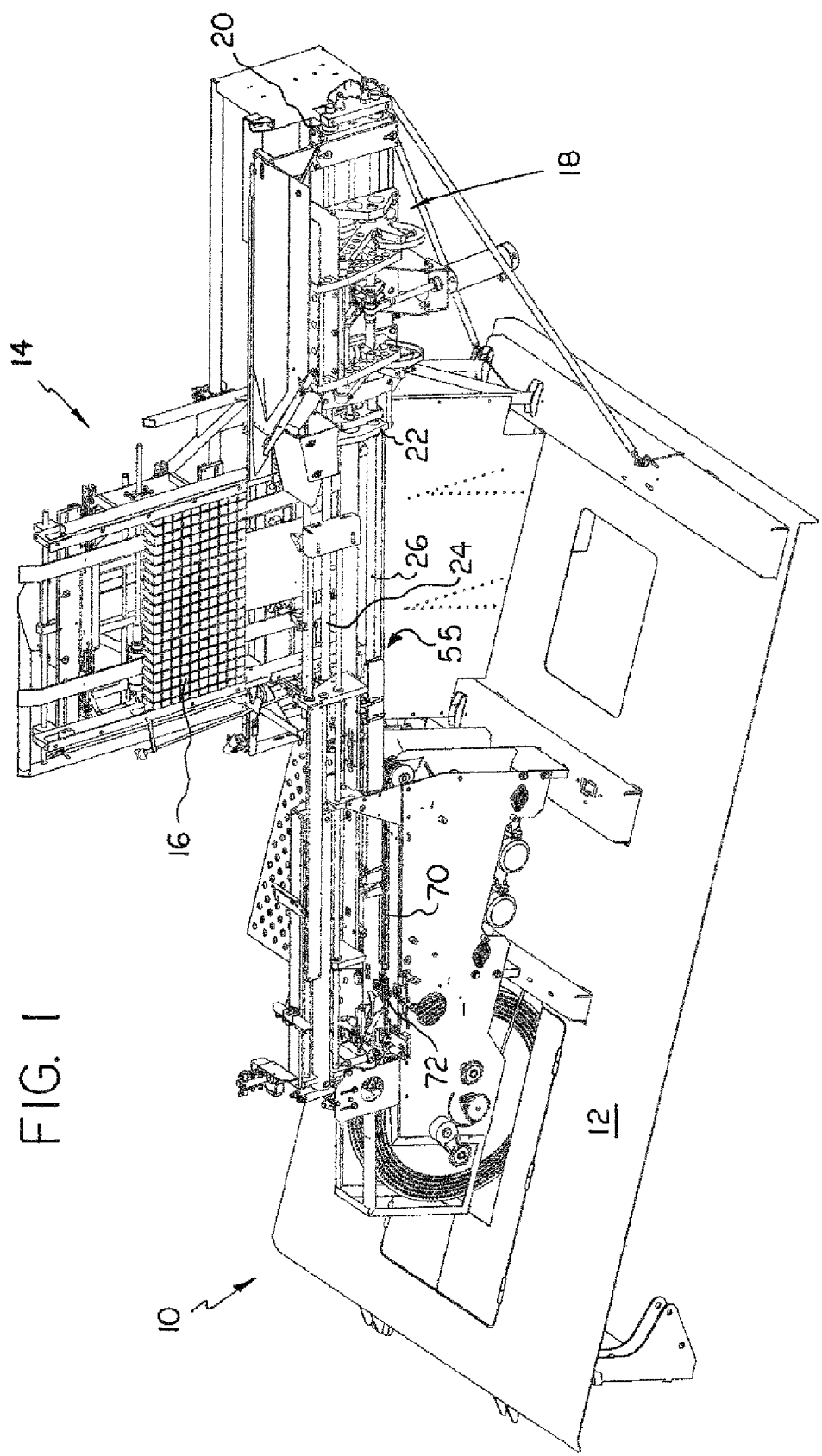
FIG. 1 is an overall view of a portion of a transplanter in which this invention is incorporated, portions having been eliminated for purposes of clarity, this view illustrating a nursery tray indexing mechanism including a nursery tray without seedlings, a carriage shown in its extended position (to the right of the nursery tray in this view), means for extracting an entire row of seedlings being mounted on the carriage, means for moving the carriage, and aggressive means for separating the leaves of seedlings in adjacent rows, wherein the aggressive means for separating the leaves is a rotating beater bar beater bar positioned at an angle with a progressive taper, the beater bar being mounted for movement with the carriage.
Figure 2:
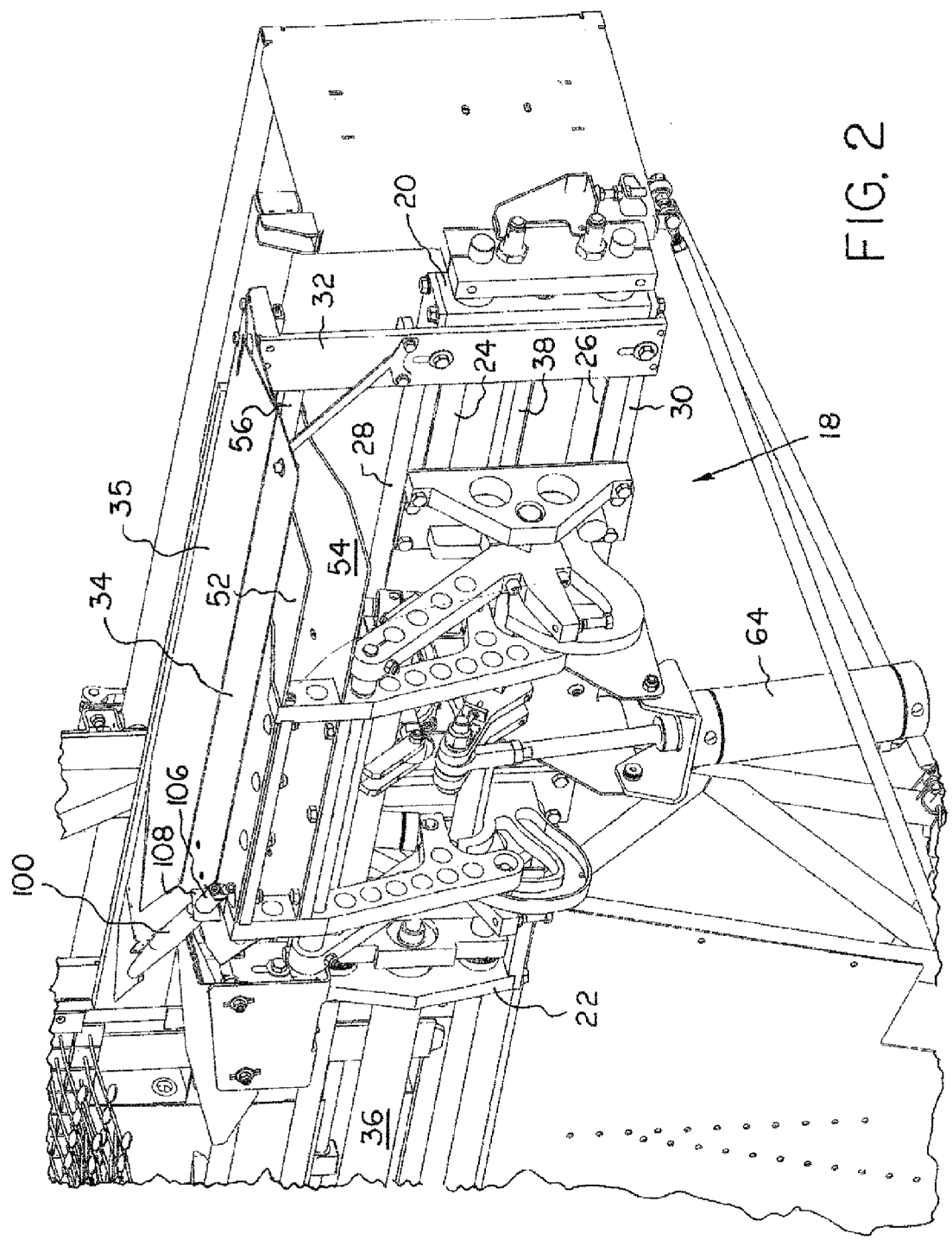
FIG. 2 is an enlarged view of a portion of FIG. 1; this view being taken from a slightly different angle and showing the carriage in its right-hand or extended position.

With reference first to FIG. 1, a transplanter is indicated generally at 10, the portion of the transplanter shown including an operator support platform 12 which supports a nursery tray indexing mechanism 14 including a nursery tray 16 shown without seedlings. In normal practice up to 3 nursery trays may be received by the tray indexing apparatus, each nursery tray having a plurality of rows of cells containing seedlings, although some cells may be voids due to failure of seeds to germinate, or grow. The seedlings are shown schematically at "S" in FIG. 5. A carriage, indicated generally at 18, is shown in its extended position (to the right of the nursery tray in this view). The carriage consists of spaced apart right and left bearing blocks 20, 22, respectively, which bearing blocks are best shown in FIG. 2. The bearing blocks slide on a pair of longitudinally extending spaced apart upper and lower shafts 24, 26, respectively. The bearing blocks are connected together by upper and lower support bars 28, 30, respectively. In addition the right hand bearing block supports a vertical member or plate 32 which has secured to it a foliage separating spear 34, 35. The carriage is caused to reciprocate by a cylinder assembly 36, the rod end 38 of the cylinder assembly being secured to right bearing block 20. The anchor end of the cylinder assembly is secured to a suitable support (no reference number) interconnected with the platform 12.

Figure 3:
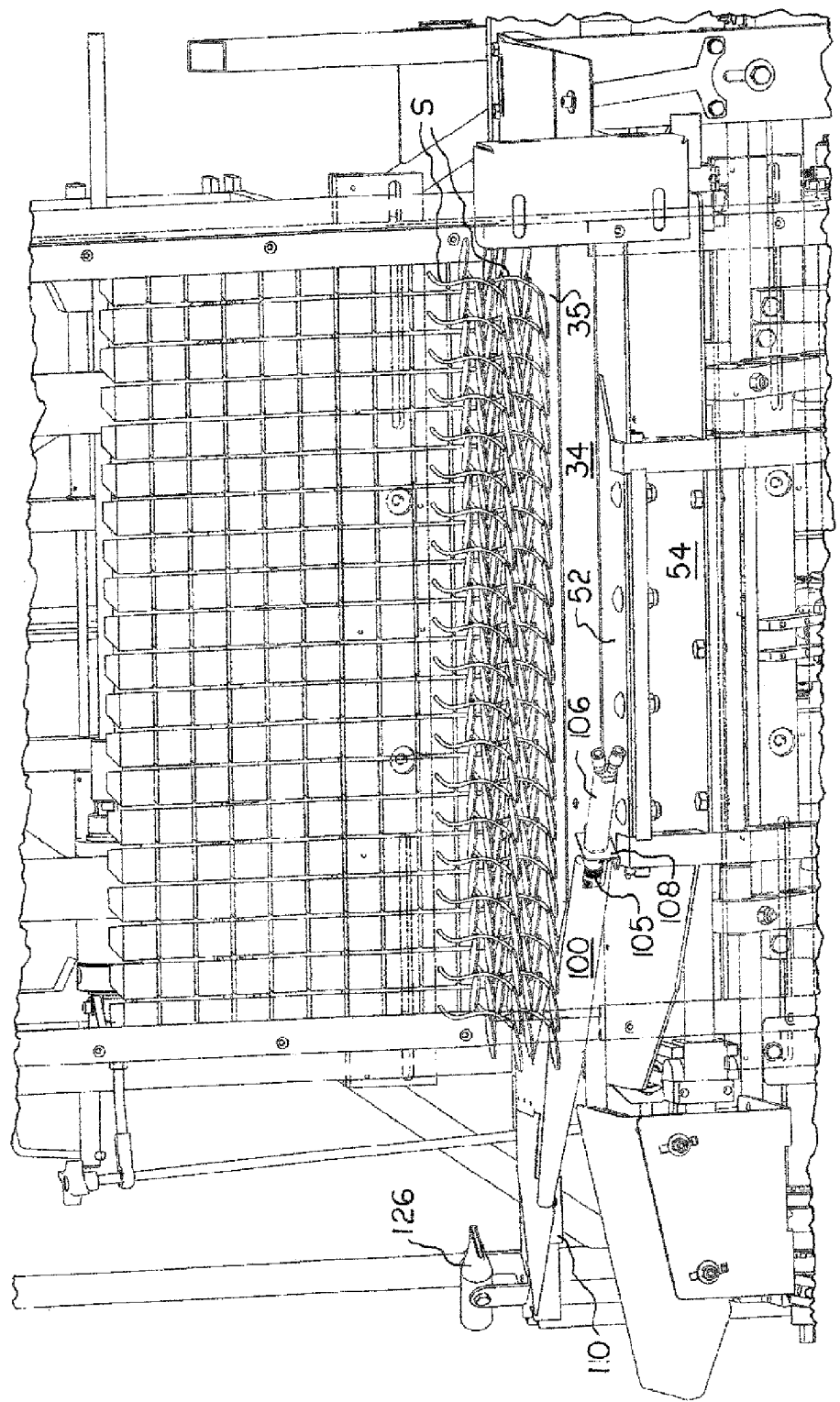
FIG. 3 is a view showing the carriage in the left-hand or retracted position, and showing the seedling extracting means engaging a row of seedlings, only two rows of seedlings being shown in the nursery tray, other rows of seedlings being omitted for purposes of clarity.

Means for extracting an entire row of seedlings are mounted on the carriage. This subassembly is indicated generally at 50. This subassembly includes spaced apart first and second seedling extraction spears or plates 52, 54. These plates or spears move between extending and retracted positions with the carriage 18, and also move between a capture position where a row of seedlings are captured between the extraction spears or plates, and a seedling hand-off position where the seedlings which have been captured are handed off to a seedling loader group indicated generally at 55 in FIG. 1 and which is described in more detail in U.S. Pat. No. 7,954, 439. A bladder 56 is carried by spear 54, a portion being shown in FIGS. 2 and 4. The bladder is of rectangular cross section and extends the length of spear 54. As shown in FIG. 2, the extracting spear plates are shown to one side of the nursery tray, and they are spaced apart from each other the width of a cell. In this position the first plate 52 lies closely adjacent the foliage separation spear 34. In the seedling capture position the first and second plates have been advanced to the left as shown in FIG. 3 and the first plate 52 continues to lie closely adjacent the foliage separation spear 34. While in this position, the plate 54 is caused to pivot slightly towards the other plate 52, and the bladder 56 is inflated to capture a row of seedlings between the plates 52, 54.

Figure 4:
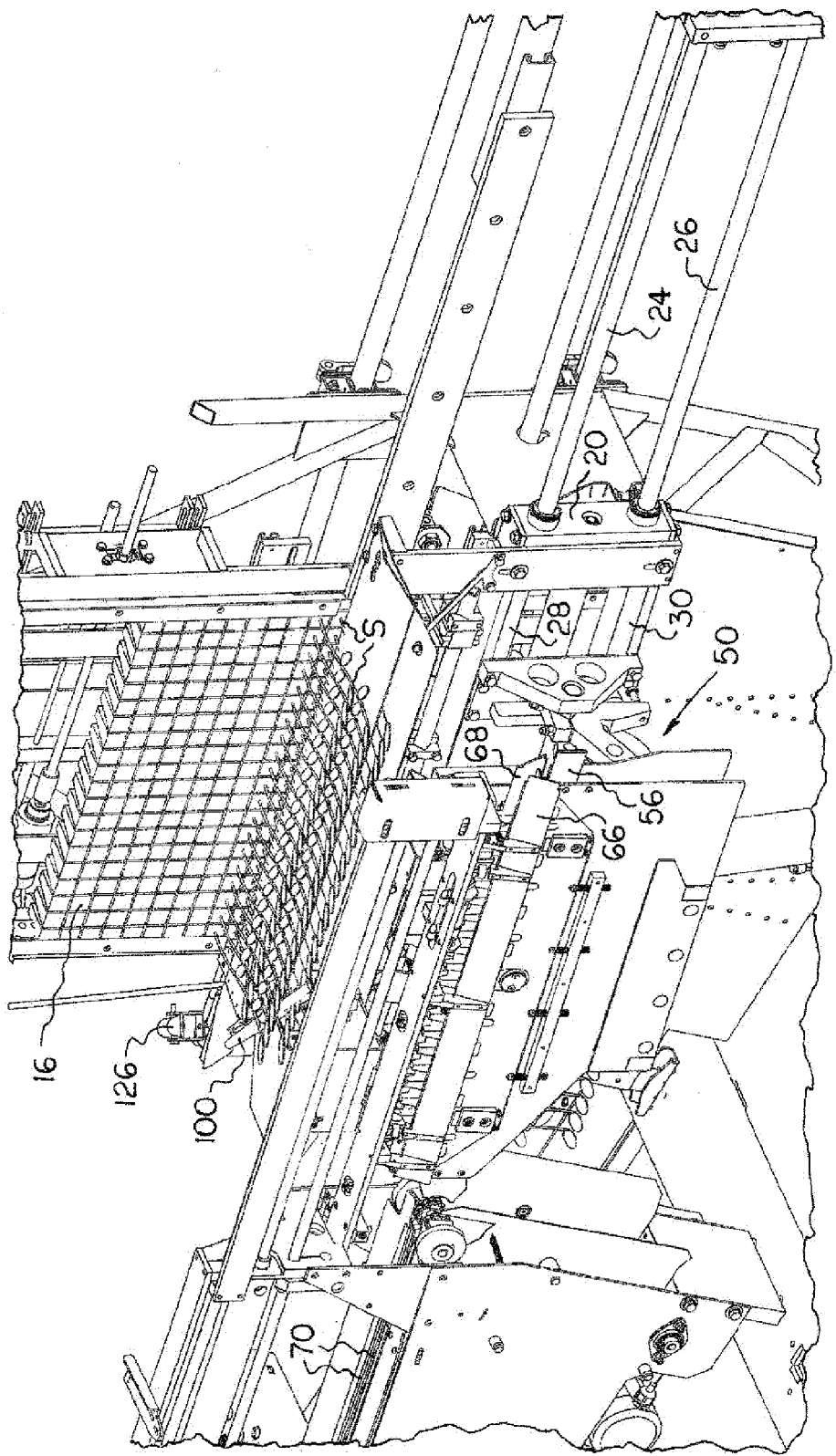
FIG. 4 is a view showing the means for extracting an entire row of seedlings in a position where it is transferring the seedlings to the seedling loader group.

After the row of seedlings has been captured, the subassembly 50 is initially moved away from the nursery tray 16, and is also pivoted away to the position shown in FIG. 4. In this position the subassembly 50 will be presenting the seedlings with the root balls in an upwardly extending position. Movement of the subassembly 50 is caused by cylinder assemblies 62, 64, the cylinder assembly 62 only being used for initial movement of the subassembly 50 away from the nursery tray 16. After the subassembly 50 achieves the position shown in FIG. 4, the seedling loader group will be operated to cause the root ball gripping plates 66, 68 of the seedling loader group to engage the root balls, and then the seedling loader group will be advanced from the seedling receiving position shown in FIG. 4 to a position where the root ball gripping plates 66, 68 may transfer the seedlings to a first pair of gap-up belts 70 as shown in FIG. 5. While the seedling loader group is transferring the row of seedlings to the gap-up belts 70, the carriage will be moved towards its partially extended position as shown in FIG. 5, and then be moved back to the fully extended position shown in FIG. 2. In addition to the first pair of gap-up belts 70, a second pair of gap-up belts 72 is used, which second pair receive the seedlings from the first pair, the two pairs 70, 72 being shown in FIG. 1. If necessary, due to a large number of voids in the nursery tray, the first pair of gap-up belts may be speeded up to avoid any skips when planting.

It is a feature of this invention that aggressive means are provided for separating the leaves of seedlings in adjacent rows immediately prior to a row of seedlings being picked up by the subassembly 50. To this end, an aggressive means for separating the leaves is a rotating beater bar 100 carried by the foliage separating spear 34, the beater bar 100 being positioned at an angle with a progressive taper, the beater bar being mounted for movement with the carriage and the spear 34. As can be seen from FIG. 6, the beater bar has an oval or rounded rectangular cross-section, and it has a tapered shape for a portion of its length. At the narrow end a pin 102 is press fit therein, the pin 102 being received in a suitable bearing (not shown) at the tip of the spear 34. At the larger end of the beater bar, another pin 104 is also press fit therein. This pin is coupled via coupling 105 to a suitable air motor 106 which is supported by a bracket 108 which is secured to an end of the spear 34. While an air motor is illustrated on bracket 108, the beater bar 100 can be rotated by other types of motors, which motors can be remotely mounted and connected to the beater bar via a suitable flexible shaft.

Figure 8:
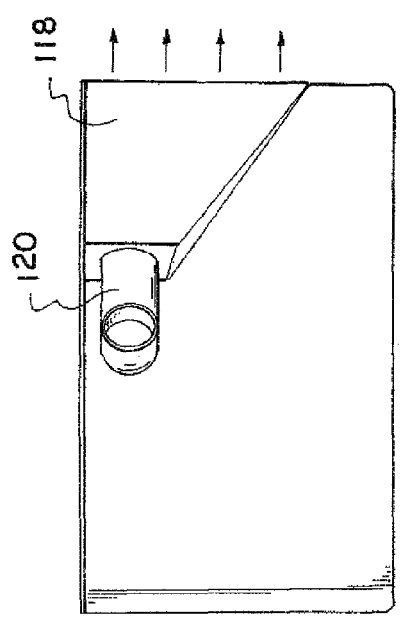
FIGS. 8-10 are front, top, and side views, respectively, of an air-knife weldment.
Figure 10:
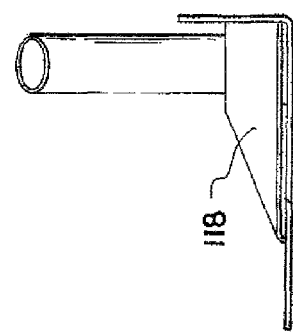
Figure 9:
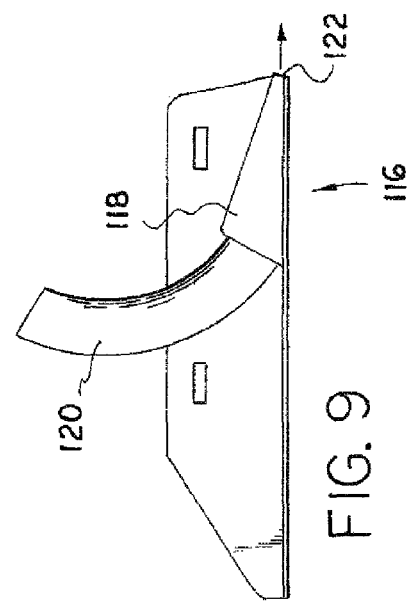

In operation, as the foliage separating spear 34 is advanced through the seedlings as it moves from the position shown in FIG. 2 to the position shown in FIG. 3, the beater bar will be rotated about two complete revolutions as it passes each cell in the nursery tray 16, the beater bar untangling the leaves of adjacent rows of seedlings. The spear 34 during its advance through the seedlings rests on the extracting spear plate 52. However, when the spear plate is moved away from the separating spear, it is necessary that an alternative support be provided. To this end, an adjustable bracket 110 is mounted on the side of the tray indexing mechanism furthest away from the support plate 32. As the beater bar is advanced the air knife means facilitates the separation the leaves of seedlings in adjacent rows immediately prior to a row of seedlings being picked up by the subassembly 50. To this end it should be understood that the term "air knife" relates to a flow of air generated by air escaping from a manifold through an elongated narrow opening, such as one ⅛ inch high by about 3 inches long. An air knife weldment is shown in FIGS. 8-10. This air knife weldment is indicated generally at 116, and includes a manifold 118 which is connected to a low pressure air source via tube 120. The manifold 118 is provided with an elongated slot 122 through which air in the form of an air knife may flow. The air knife weldment is mounted on the leading edge of the carriage 18 and is directed to that the flow or air is between the first and second extraction plates or spears 52, 54 to cause the stem, and leaves or foliage of the seedlings to extend away from the root balls. In addition, a further air nozzles 126 is provided, which further air nozzle is mounted on the frame of the transplanter at a location to one side of the nursery tray indexing mechanism, the further air nozzle causing the stem, and leaves or foliage of the last couple of seedlings to also be extended away from the associated root ball.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the terms as used in the claims are intended to include not only the designs illustrated in the drawings of this application and the equivalent designs discussed in the text, but are also intended to cover other equivalents now known to those skilled in the art, or those equivalents which may become known to those skilled in the art in the future.

What is claimed is:

1. Apparatus for separating seedling plants having leaves grown in adjacent rows in nursery trays and for picking up an entire row of seedlings from a nursery tray without significant damage to the leaves of seedlings in adjacent rows, which nursery tray may be provided with a plurality of adjacent rows of seedlings, each seedling including a root ball, stem, and leaves; the apparatus comprising:
 a nursery tray indexing mechanism which indexes nursery trays one row at a time;
 a carriage;
 means for extracting an entire row of seedlings mounted on the carriage;
 means for moving the carriage between a extended position where the means for extracting an entire row of seedlings is to one side of the tray indexing mechanism and a retracted position where the means for extracting an entire row of seedlings is located adjacent a nursery tray; and
 aggressive means for separating the leaves of seedlings in adjacent rows, wherein the aggressive means for separating the leaves is a rotating beater bar, the beater bar being positioned at an angle to the nursery tray and the beater bar being provided with a progressive taper, the beater bar being mounted for movement with the carriage.

2. The apparatus set forth in claim 1 wherein the means for extracting an entire row of seedlings include a pair of spaced apart seedling extraction spears which are mounted on the carriage for pivotal movement between a first position where the seedling extraction spears grasps the stems of seedlings in a row on the nursery tray, and a second position where the root balls of the seedlings are grasped by a seedling loader group which transfers the seedlings to a gap-up belt assembly, the apparatus further being characterized by the provision of a foliage separation spear assembly which carries the beater bar, which foliage separation spear assembly is not mounted for pivotal movement with the carriage, but which is mounted for reciprocal movement with the carriage.

3. The apparatus as set forth in claim 1 wherein the beater bar is rotated at about 1000 rpm.

4. The apparatus as set forth in claim 1 wherein the carriage is advanced a distance equal to one cell of the nursery tray as the beater bar is rotated about two revolutions.

5. The apparatus as set forth in claim 1 wherein the beater bar has a rounded rectangular cross-section.

6. The apparatus as set forth in claim 5, wherein the beater bar is tapered for only about ½ of the length of the beater bar.

7. The apparatus as set forth in claim 1 wherein a stationary air nozzle is provided adjacent the side of the nursery tray last contacted by the beater bar, which stationary air nozzle blows the leaves of the seedlings at one end of the row.

8. The apparatus as set forth in claim 1 wherein an air knife is mounted adjacent the beater bar, the air knife keeping the plants adjacent the beater bar up.

* * * * *